US008996347B2

(12) United States Patent
MacLean et al.

(10) Patent No.: US 8,996,347 B2
(45) Date of Patent: Mar. 31, 2015

(54) DIGITAL WIRE HARNESS ASSEMBLY SYSTEM

(75) Inventors: Greg A. MacLean, Westwood, NJ (US); Michael J. Spellman, Westwood, NJ (US)

(73) Assignee: Autodesk, Inc., San Rafael, CA (US)

( * ) Notice: Subject to any disclaimer, the term of this patent is extended or adjusted under 35 U.S.C. 154(b) by 662 days.

(21) Appl. No.: 12/383,305

(22) Filed: Mar. 23, 2009

(65) Prior Publication Data

US 2009/0265923 A1 Oct. 29, 2009

Related U.S. Application Data

(60) Provisional application No. 61/070,510, filed on Mar. 24, 2008.

(51) Int. Cl.
*G06F 17/50* (2006.01)
*H01B 13/012* (2006.01)

(52) U.S. Cl.
CPC ................................ *H01B 13/01227* (2013.01)
USPC ........................................................... 703/13

(58) Field of Classification Search
USPC ........................................................... 703/13
See application file for complete search history.

(56) References Cited

U.S. PATENT DOCUMENTS

| | | | | |
|---|---|---|---|---|
| 6,477,437 | B1 * | 11/2002 | Hirota | 700/95 |
| 2003/0163917 | A1 * | 9/2003 | Davidshofer et al. | 29/854 |
| 2004/0131232 | A1 * | 7/2004 | Meisner et al. | 382/103 |
| 2007/0009698 | A1 * | 1/2007 | Hoheisel | 428/40.1 |
| 2007/0277372 | A1 * | 12/2007 | Aida et al. | 29/747 |
| 2008/0054154 | A1 * | 3/2008 | Lin | 248/693 |

FOREIGN PATENT DOCUMENTS

WO WO03031094 * 4/2003

* cited by examiner

*Primary Examiner* — Kamini S Shah
*Assistant Examiner* — Russ Guill
(74) *Attorney, Agent, or Firm* — Ferdinand IP

(57) ABSTRACT

An electronic wire harness assembly system having a transparent pegboard with a rear mounted digital display such as an LCD or plasma display is controlled by a proprietary software program running on a personal computer. The digital display provides peg location illumination, wire run path location illumination, connector shape illumination and location illumination, as well as cable tie location illumination. The operator is visually assisted with notes and videos displayed under the pegboard at the appropriate locations. The pegboard grid is registered to the digital display with simple mouse pointer clicks.

2 Claims, 11 Drawing Sheets

DIGITAL WIRE HARNESS ASSEMBLY SYSTEM

CROSS REFERENCES TO RELATED APPLICATIONS

This application claims priority benefit of a U.S. Provisional Application Ser. No. 61/070,510 filed in the United States Patent and Trademark Office on Mar. 24, 2008, and entitled “DIGITAL WIRE HARNESS ASSEMBLY SYSTEM”.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to wire harnesses, and more particularly to a system for assembling wire harnesses using a transparent peg board with a rear mounted visual display system.

SUMMARY OF THE INVENTION

A transparent peg board is mounted in front of a display system such as an LCD or plasma display. The display is driven by a proprietary computer program running on computer. A plurality of round dots are illuminated on the display that align with pre-determined peg holes thus indicating to an operator where various pegs should be mounted. After the pegs have been installed the wire runs are displayed one by one as the operator lays in the wire runs in the appropriate locations. Visual notes with instructions and or videos are displayed on the LCD or plasma display to assist the operator. Finally wire ties and connectors may be assembled to the harness. There is also a Quality Control mode of the program so that a QC inspector may come onto the job and inspect the ‘as built’ harness on the pegboard before it is removed.

The advantages and features discussed above and other advantages and features will become apparent from the detailed description of the best mode for carrying out the invention that follows.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENT

Figure 1:
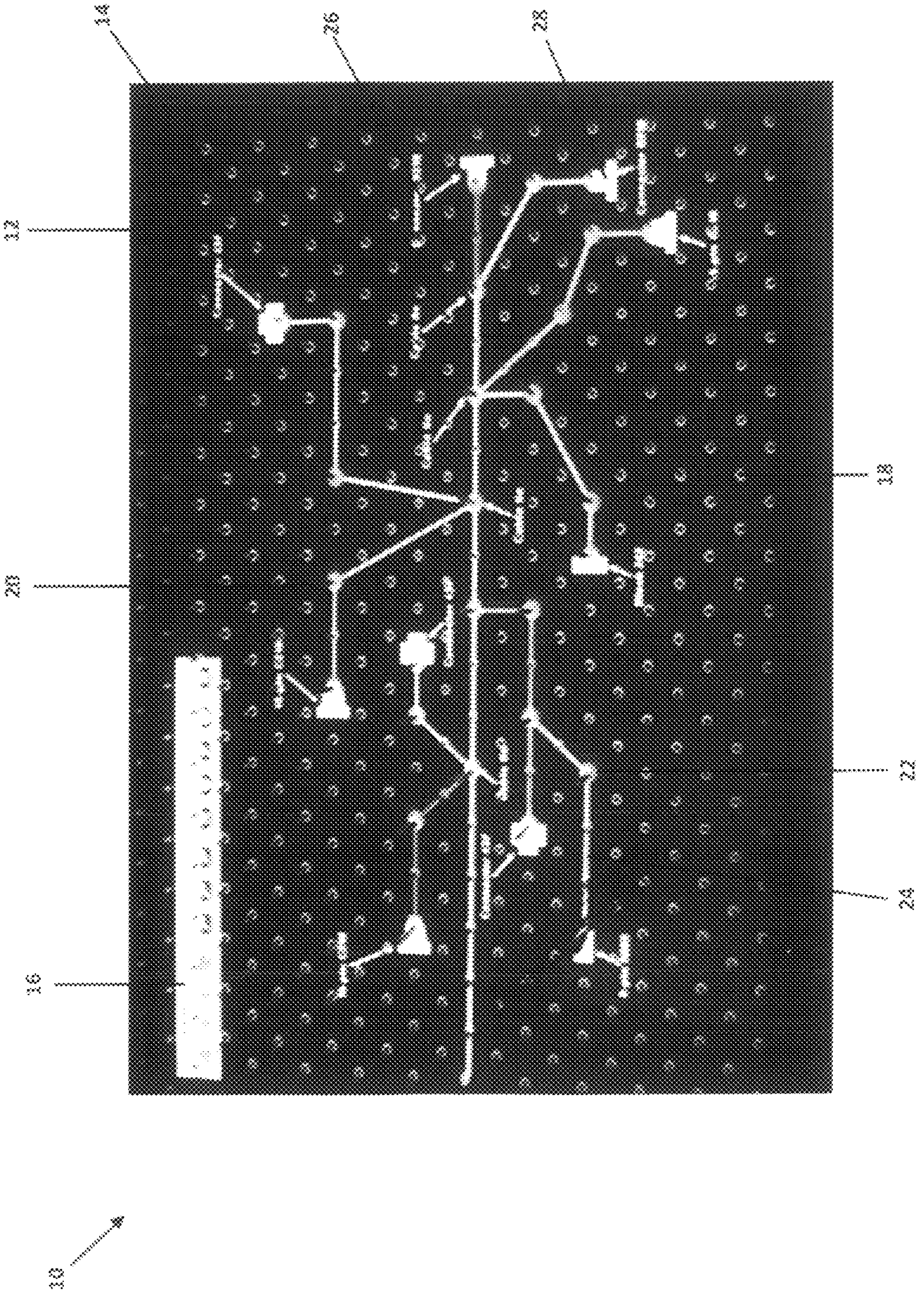
FIG. 1 is a perspective view of the digital wire harness system.

Referring now to FIG. 1, a digital wire harness assembly system 10 is shown. A transparent pegboard 12 is mounted on a digital display 14. Because the pegboard 12 is optically transparent, any images (as described below) displayed by the digital display 14 are easily viewed by the operator (not shown). For example the toolbar 16, which is an image being displayed by the digital display 14 which is beneath the pegboard 12 in this view, is easily seen in the upper left hand corner of the pegboard 12. The digital display 14 is simply ‘mirroring’ the monitor display of a local personal computer (PC) running a proprietary software program. The operator can change the location of the toolbar 16 in several ways. One is by walking over to the PC and using conventional techniques drag the toolbar 16 on his desktop display to a new location. The digital display 14 mirrors the desktop display (not shown).

The pegboard 12 has a plurality of pegholes 18 drilled into its surface. The pegholes 18 are designed to receive a variety of pegs 20. The pegholes 18 are illuminated or backlit with a green circle 22 of light emanating from the digital display 14. Such light is coming from the digital display 14 as commanded by the PC. During an initialization process controlled by the operator and PC, the display 14 was registered or aligned with the pegholes 18 so that the green circles 22 of light were all aligned with their respective pegholes 18. Once the on-center distance between pegholes 18 is selected on the PC at initialization, and the pegboard 12 is registered with the display 14, the PC software generates an illumination pattern of where to display the green circles 22 of light so that they illuminate exactly behind the pegholes 18 which are to be populated with pegs 20 by the operator in the assembly process.

Pegs 20 are inserted into the peghole 18 locations illuminated by the green circles 22. The display 14 also illuminates the various wire runs 24, cable ties 26, and a variety of connectors 28. Not only is the shape of the particular connector 28 shown, but a text description 30 is displayed in a location next to the connector 28. The connector 28 shape and text description 30 assist the operator in making sure the right connector 28 is assembled in that particular location. This is a great aid in eliminating costly operator errors.

As stated above the wire runs 24 are similarly illuminated by the display 14. In FIG. 1 all of the wire runs 24 are being illuminated at once, but in the build mode they are illuminated one at a time as the operator builds the harness 32. In the build mode, only after a wire run 24 has been installed does the program move forward and display the next wire run 24. Wire runs 24 can be color coded to indicate differing parameters such as wire size, type, gauge, insulation, and or color.

It should be noted that in this application the term 'wire' applies to any flexible conduit or tube such as optical fiber, flexible tubing, catheter, biologic tubing, nanotubing, synthetic strand materials such as Kevlar or Nylon, and any other duct, vessel or canula which can be formed in pathways.

Currently digital displays 14 such as plasma are approximately 30-60 inches diagonally in size but larger displays 14 have been manufactured at over 100 inches. This size limitation does not limit the size of this invention or pegboard 12 as the displays 14 can be linked together beneath a common pegboard 12. The display software takes the entire image and breaks it up into appropriate visual segments to be displayed on each of the linked displays 14. Special image stitching software is used to make sure that the total image displayed is true to the real dimensions required for the harness 32. In other words the dead zones between the individual displays 14 is taken into consideration so that a wire run 24 from one display 14 to a peg 20 on the next display 14 is still dimensionally accurate. Special techniques are used to minimize the dead zones between displays 14 such as removing any bezel or frame and mounting the displays as close together as possible. Thus the pegboard 12 may be any width or length using this 'stitching' approach.

Another technology which may be used in conjunction with large pegboards 12 are the electronic billboards now beginning to populate our stadiums and highways. These billboards are large digital displays 14 that can be controlled in the same manner as in the digital wire harness assembly system 10. Essentially the modular LED components and software to coordinate the individual displays 14 into one large visual display 14 removes size alone as a limitation.

Still referring to FIG. 1, some of the pegs 20 installed in the pegboard 12 are translucent plastic filled with a luminescent dye such that when they are backlit by the circle of light 22 on the display, the peg 20 itself lights up and can be seen from any direction in the workspace. The top of the peg 20 has a hemispherical shape so as to disperse the light 22 entering the bottom of the peg 20 shaft in all horizontal directions.

Figure 2:
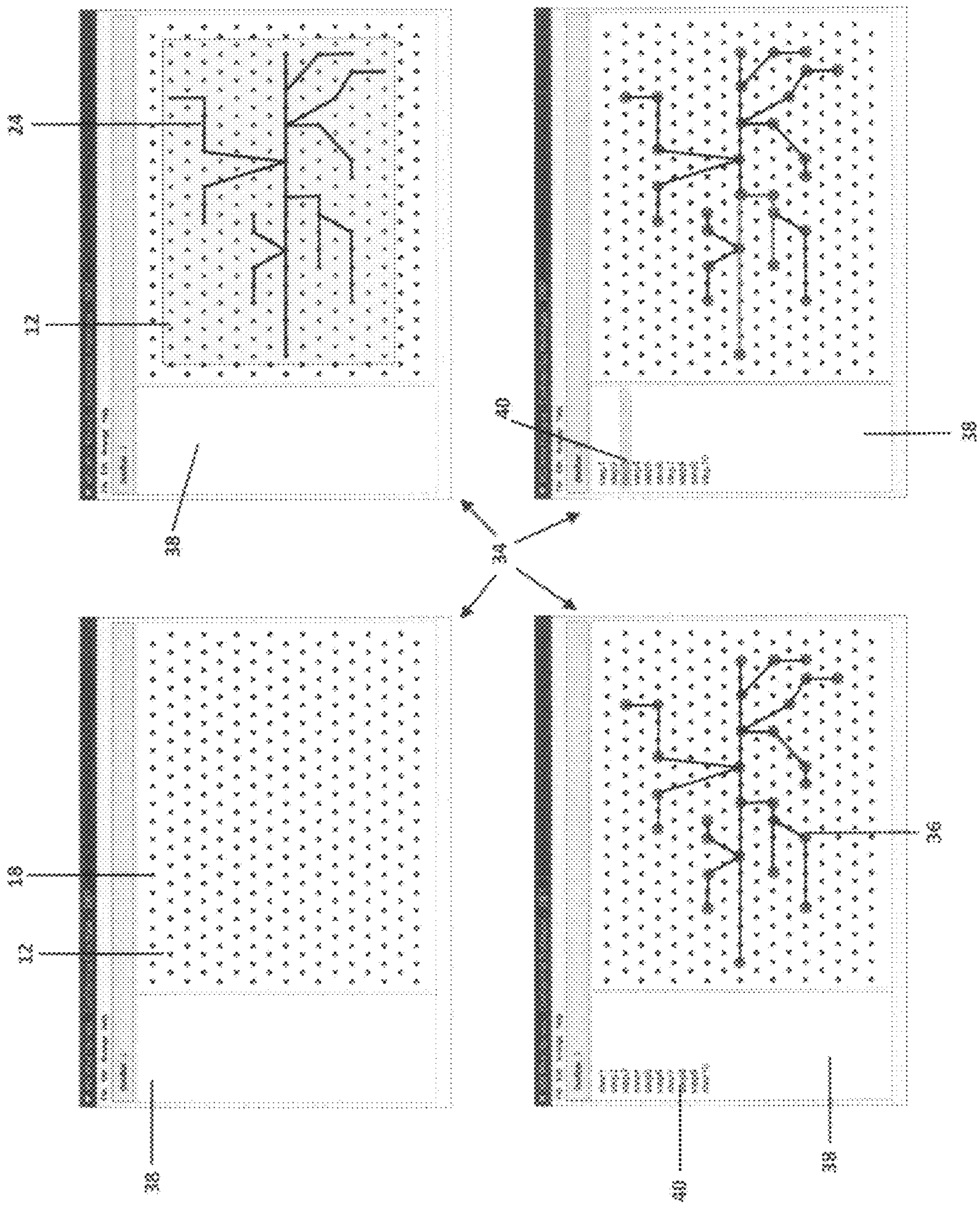
FIG. 2 is a series of screen shots of the application software user interface.

Referring now to FIG. 2 a series of screen shots (SS) 34 are shown illustrating the building sequence used by the software and PC to generate a working electronic pegboard 12. These screen shots 34 are displayed on the PC monitor during the assembly sequence. In the first screen shot, an empty pegboard 12 is shown with the peghole 18 interspacing as specified in the initialization sequence. In the second SS, the pegboard 12 area is highlighted in yellow and the wire runs 24 are laid out. In the 3rd SS, the peg locations 36 to be populated by pegs 20 are determined to best accommodate the wire runs 24. In the 4th SS, the order of install of each of the wire runs 24 is selected. In each of the SS 34, a list box 38 is displayed showing the operator what step of the build is being displayed. The steps 40 are clearly shown in the 3rd and 4th SS 34.

It should be noted that the pegboard 12 must be transparent, not just translucent, for this invention to work. It must be completely transparent so that the operator can clearly see any of the visual information displayed by the LCD or plasma display 14 behind the pegboard 12. The pegholes 18 can be placed on the transparent pegboard 12 in any pattern and any size depending upon the type of harness 32 and or wire sizes to be used.

Figure 3:
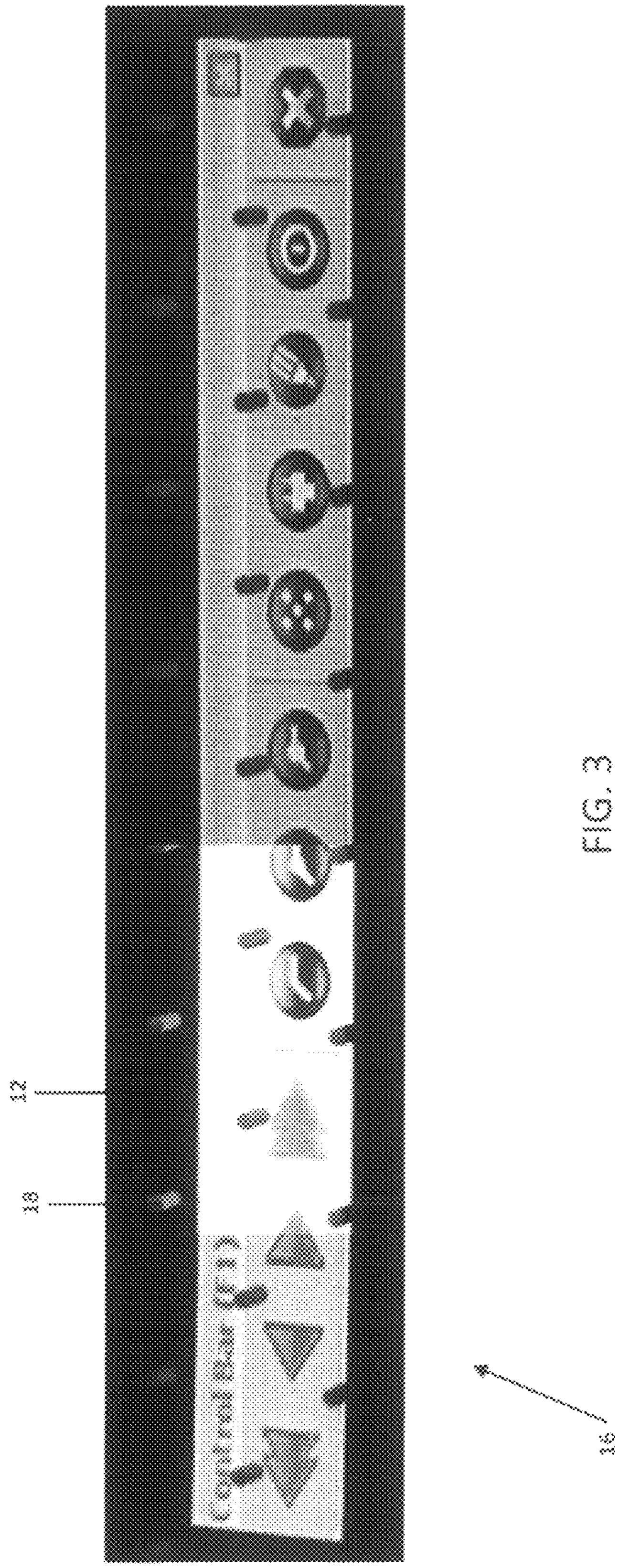
FIG. 3 is a schematic of the toolbar as displayed on the digital wire harness system.

Referring now to FIG. 3 a toolbar 16 is shown. This tool bar 16 is visible through the transparent pegboard 12 and the pegholes 18 can be seen in a clear pattern just floating over the toolbar 16. The toolbar 16 can be positioned anywhere on the digital display 14 and thus anywhere on the pegboard 12 by simply dragging it on the PC desktop. Another method for repositioning the toolbar 16 is to use a wireless mouse (not shown) sliding on the pegboard 12. The wireless mouse controls the location of the cursor (also displayed on the digital display 14 in certain modes) and thus the mouse can be slid/maneuvered to position the cursor image on the digital display 14 over the toolbar 16 image on the display 14 and click/drag the toolbar 16 to a new location on the digital display 14.

The toolbar 16 can be used by an operator sitting at the PC in a conventional manner or by an operator at the pegboard 12 by using a touch sensitive display screen or other technology to sense the operators pressure touches to the pegboard. It can also be activated by the wireless mouse as described above by moving an image cursor over a tool icon 40 on the toolbar 16 and clicking.

Figure 4:
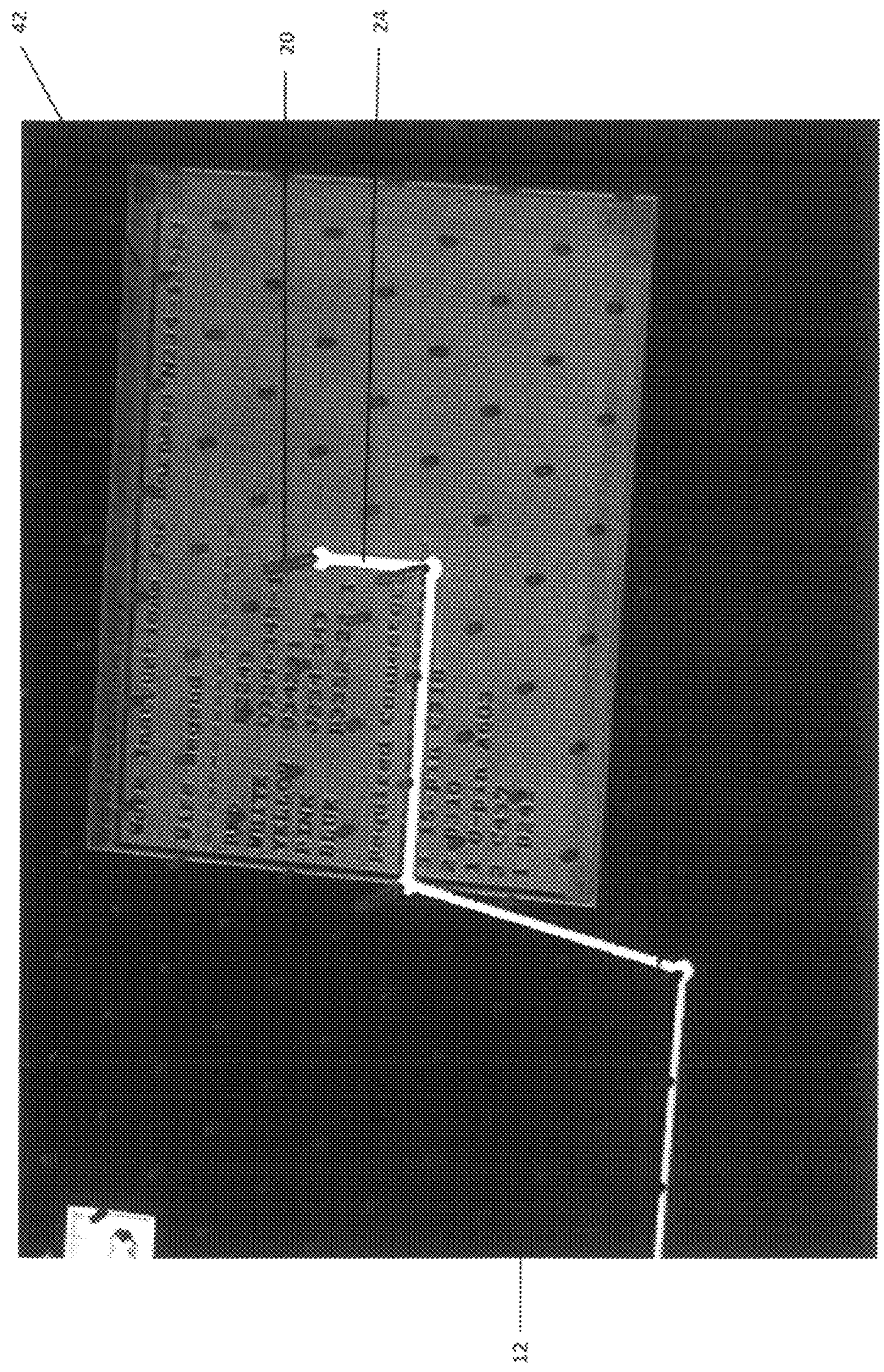
FIG. 4 is a schematic of an instruction display on the digital wire harness system.

Referring now to FIG. 4, an instruction note 42 is displayed on the digital display 14 near a current work location. The wire run 24 is being displayed simultaneously with the note 42. The note 42 is clearly visible and readable under the transparent pegboard 12. The note 42 is being displayed to the operator in a specific location on the pegboard 12 to assist the operator in performing the assembly. Thus the operator is well focused in that his manual task in his direct view also contains written instructions to assist him. He does not have to physically go to a manual on a distant bench or desk, or even turn his attention away to look at notes on a nearby stand. Such information as connector type and location, wire color and size, special termination requirements and the like may be useful to the operator. These 'notes' 42 can be positioned anywhere in the display 14 space and thus anywhere on the pegboard 12. Video notes 44 (videos played by Quicktime or Windows Media Player) may also be displayed in that the LCD or plasma display 14 can play a movie in any size or location behind the pegboard 12. Such videos may be in avi, mpeg, animated gif or other familiar video formats, and they may contain special instructions or views to assist the operator.

Figure 5:
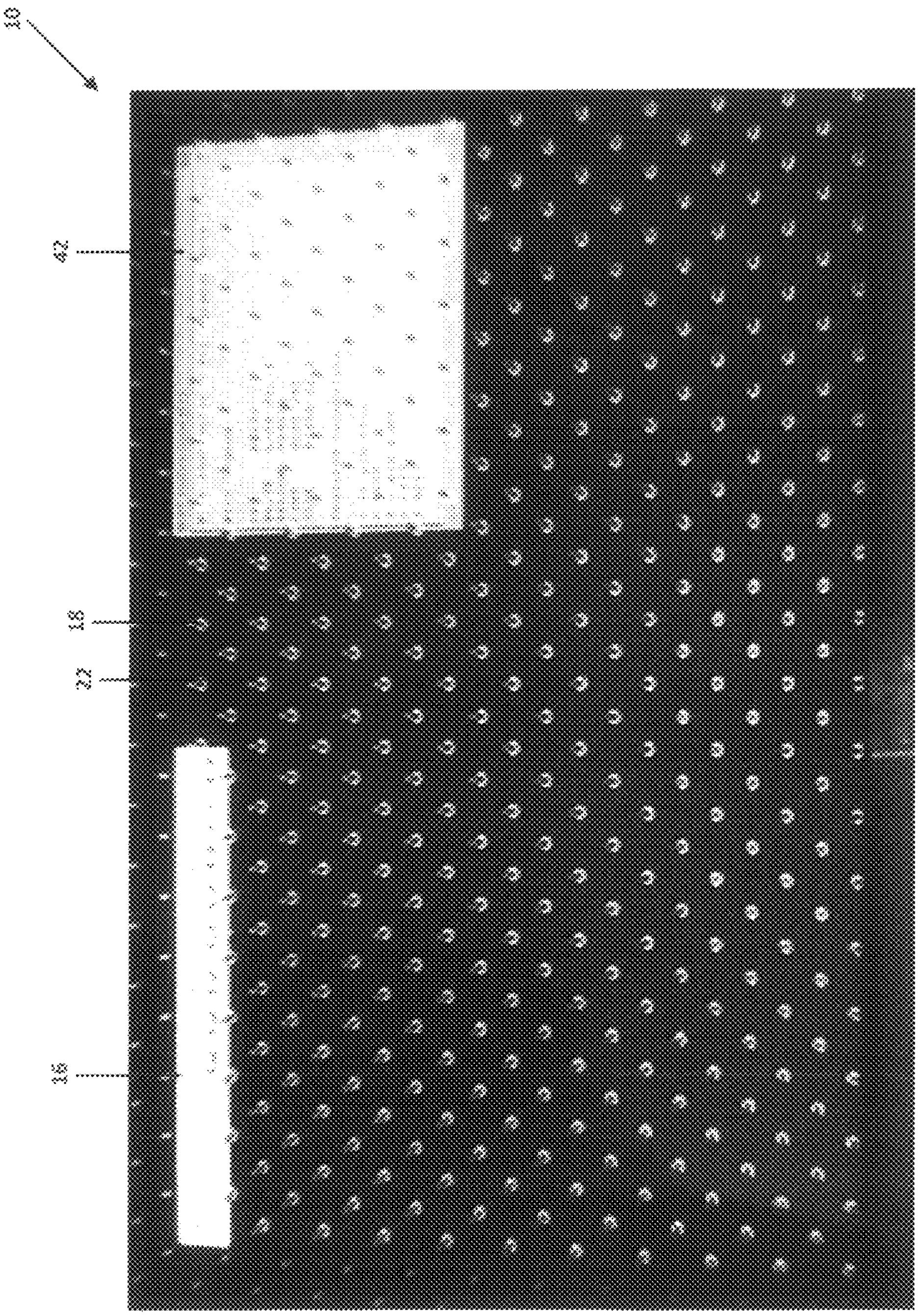
FIG. 5 is schematic of the pegboard holes being calibrated with the peg light circles on the image display.

Referring now to FIG. 5, the digital wire harness assembly system 10 is shown with the pegholes 18 illuminated by circles of light 22, a displayed toolbar 16 and a displayed instruction note 42. The transparency of the pegboard 12 allows clear images to emanate from the display 14. FIG. 5 also shows the transparent pegboard 12 overlayed on the digital display 14 for calibration. The operator simply moves the cursor 46 until its pointer image is directly under the upper leftmost peghole 18 and clicks. He performs the same operation on the lower rightmost peghole 18. After that the peghole 18 grid size is entered into the program such as 1" horizontal and vertical on-center spacing of the pegholes 18. The program automatically generates all the circles of light 22 on the display 14 that align with and illuminate the pegholes 18 on the grid.

Figure 6:
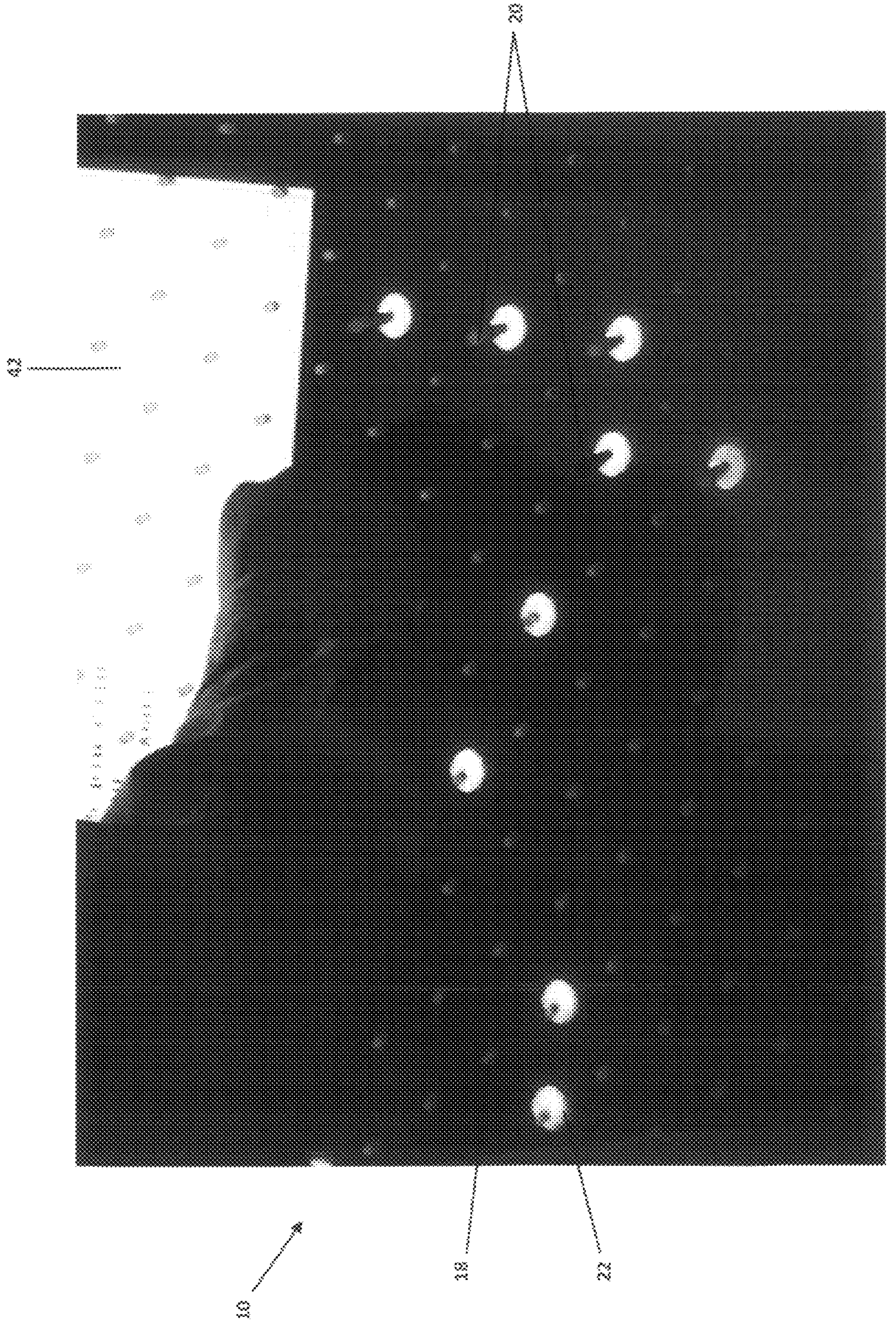
FIG. 6 is a perspective view of the pegs being inserted into the pegboard.

Referring now to FIG. 6, the digital wire harness assembly system 10 is shown with only the wire run 24 pegholes 18 illuminated by circles of light 22, and a displayed instruction note 42. An operator is shown installing the pegs 20 into the peghole 18 pattern as illuminated by the circle of light 22 under software program control. It can be seen that some pegs 20 illuminate while the solid pegs 20 do not. This is for illustration as to the benefits of illuminating pegs 20.

Figure 7:
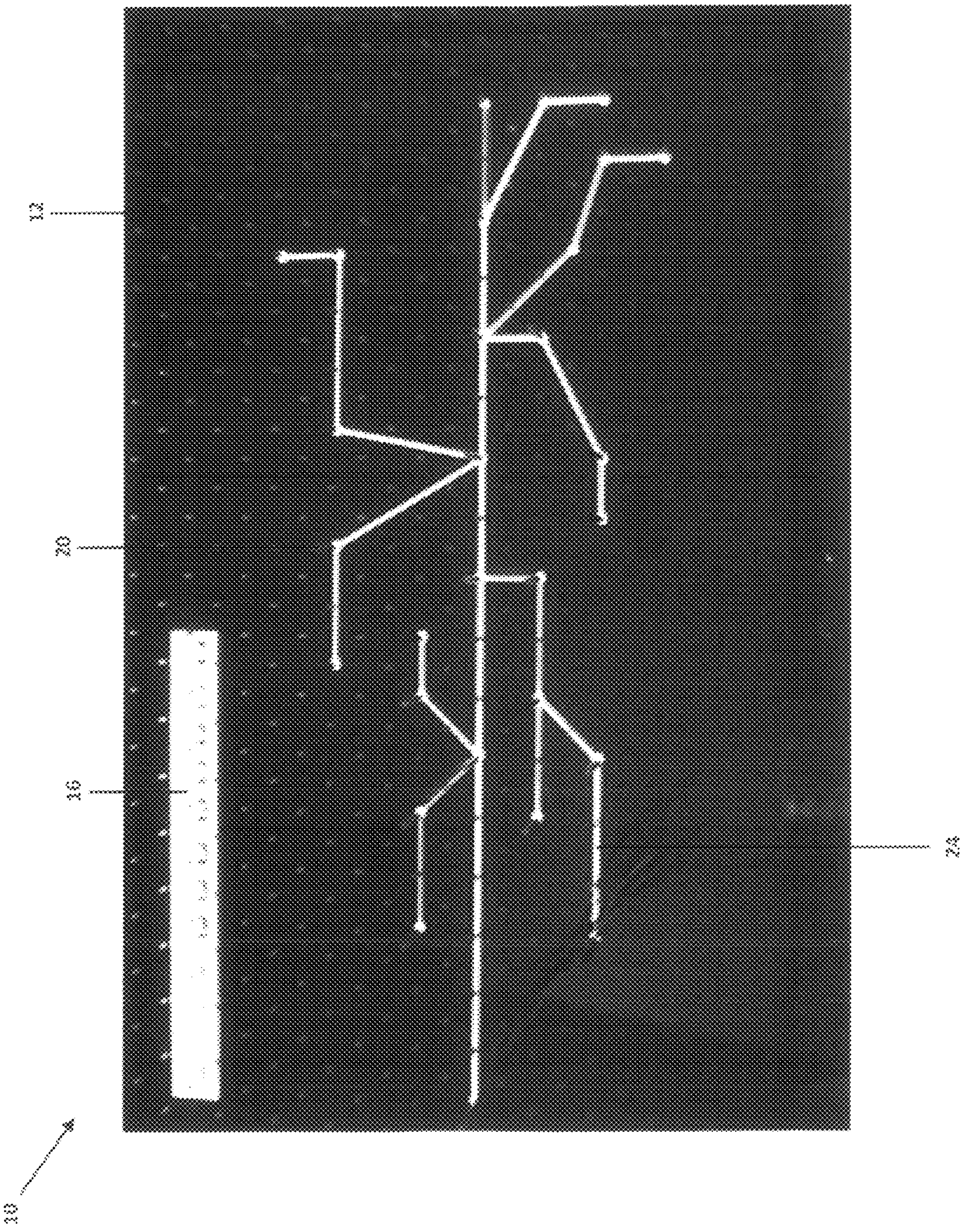
FIG. 7 is a schematic of a color display illuminating a wire harness build plan.

Referring now to FIG. 7, the digital wire harness assembly system 10 is shown with various wire runs 24 illuminated in a variety of colors. Each wire run 24 may have its own color. Thus an operator will lay down one specific wire on one wire run 24 or color trace from end to end, such as the color yellow. He will then lay down a physically different wire (it may or may not be the same gauge wire) on a second wire run 24 indicated by a different color such as green. Thus the uniquely colored wire runs 24 clearly show the pathway for each wire the operator is installing on the pegboard 12. The wires will be securely held in place by the pegs 20 until cable ties 26 are installed.

Figure 8:
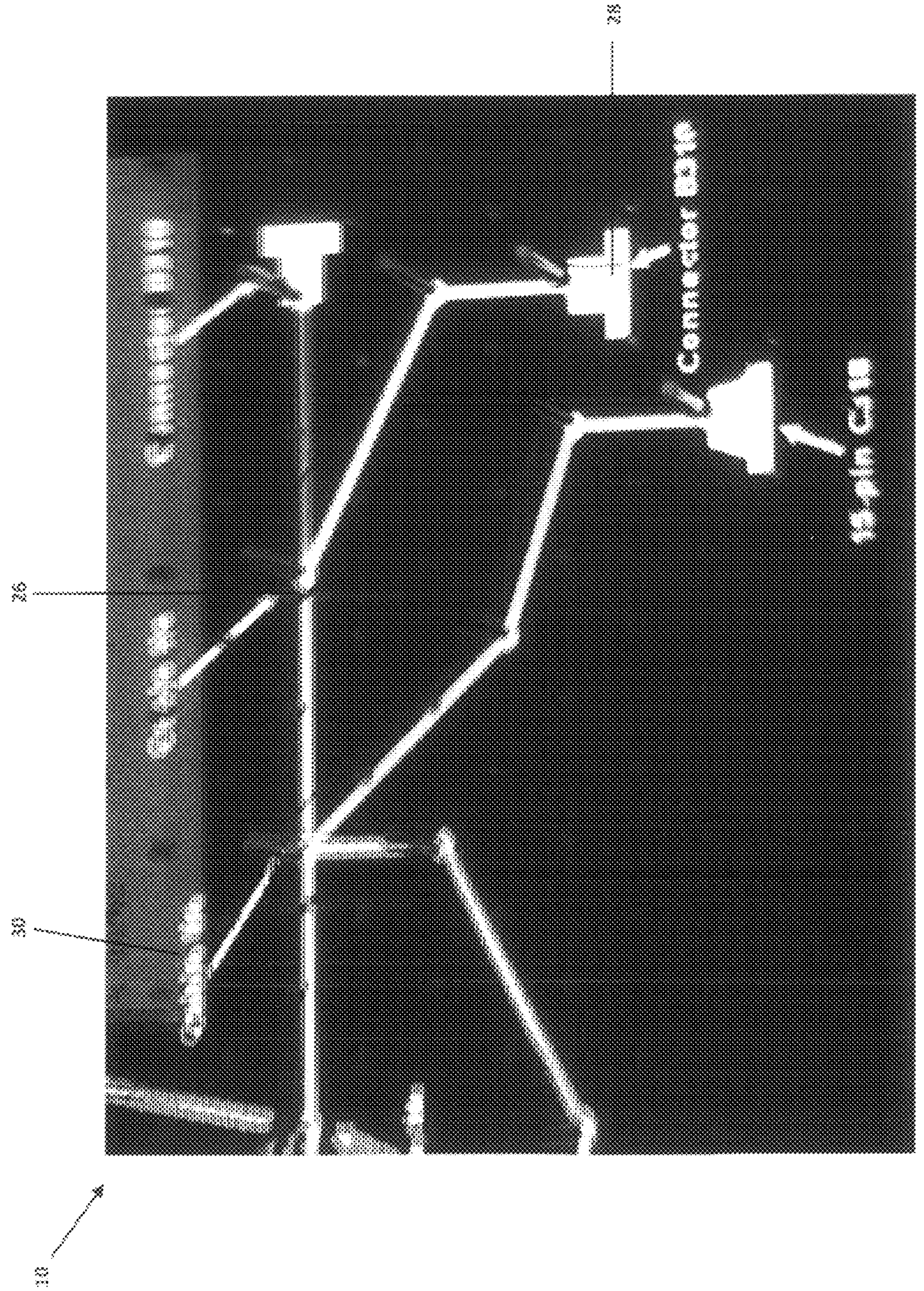
FIG. 8 is a schematic showing various assembly information for operator guidance.

Referring now to FIG. 8, the digital wire harness assembly system 10 is shown with additional display information for the operator. The digital display 14 is rendering images of connector 28 name, shape and location information. Text information 30 is also displayed describing for example location of cable ties 26, wire type and color, and other specialized assembly instructions.

Figure 9:
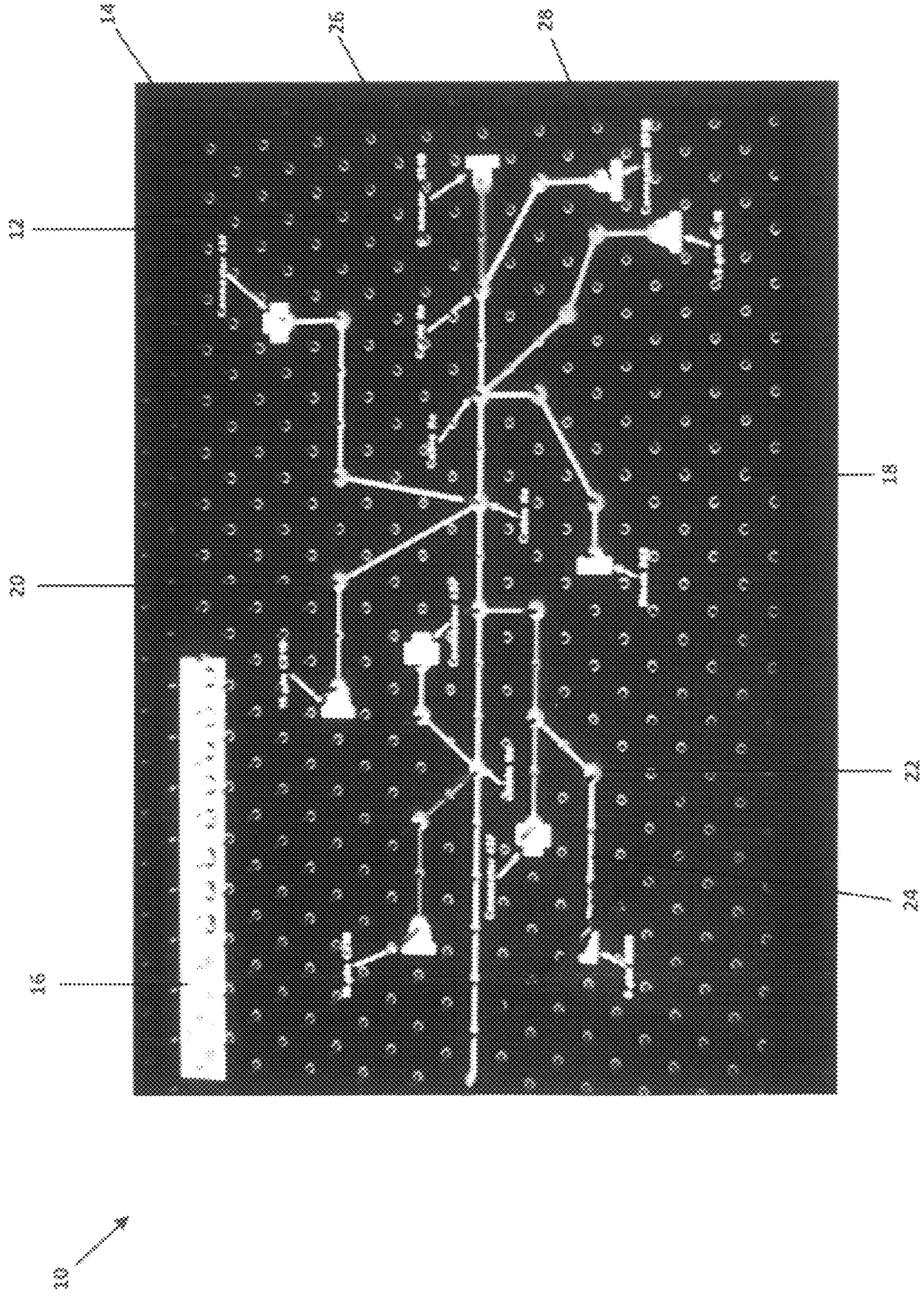
FIG. 9 is a schematic showing graphical representation of connector types and locations.

Referring now to FIG. 9, the digital wire harness assembly system 10 is shown with wire run 24, connector 28, and cable tie 26 information all displayed simultaneously demonstrating a full wire harness 32, cable tie 26 and connector 28 layout.

Figure 10:
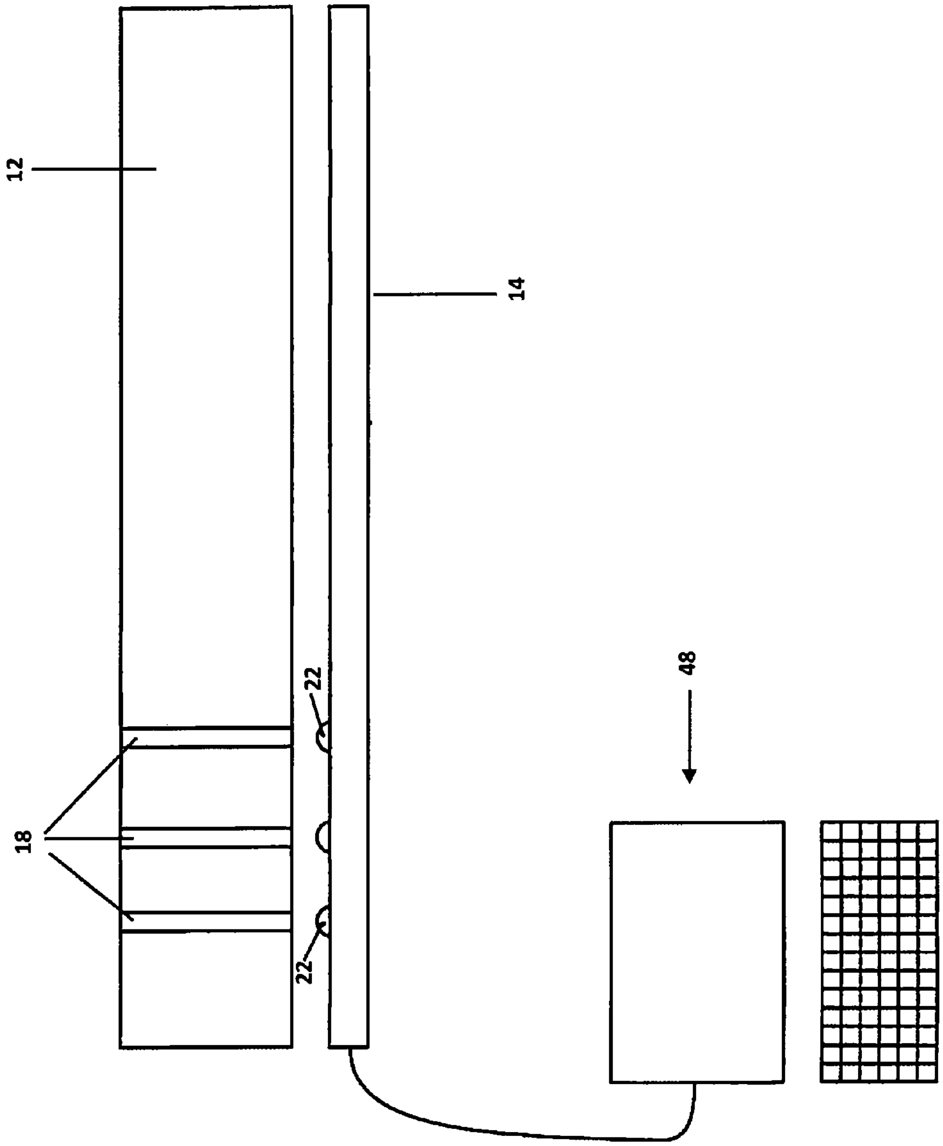
FIG. 10 is an perspective view of the digital wire harness system and computer.

Referring now to FIG. 10 a side view of the digital wire harness assembly system 10 is shown. The display 14 is shown beneath or under the pegboard 12. The circles of light 22 are aligned with the pegholes 18. The display is controlled by proprietary software executing on the PC 48. The mirror video image being sent to the display 14 is carried by any standard video signal such as S video or HD video. The display 14 can be LCD or plasma technology.

Figure 11:
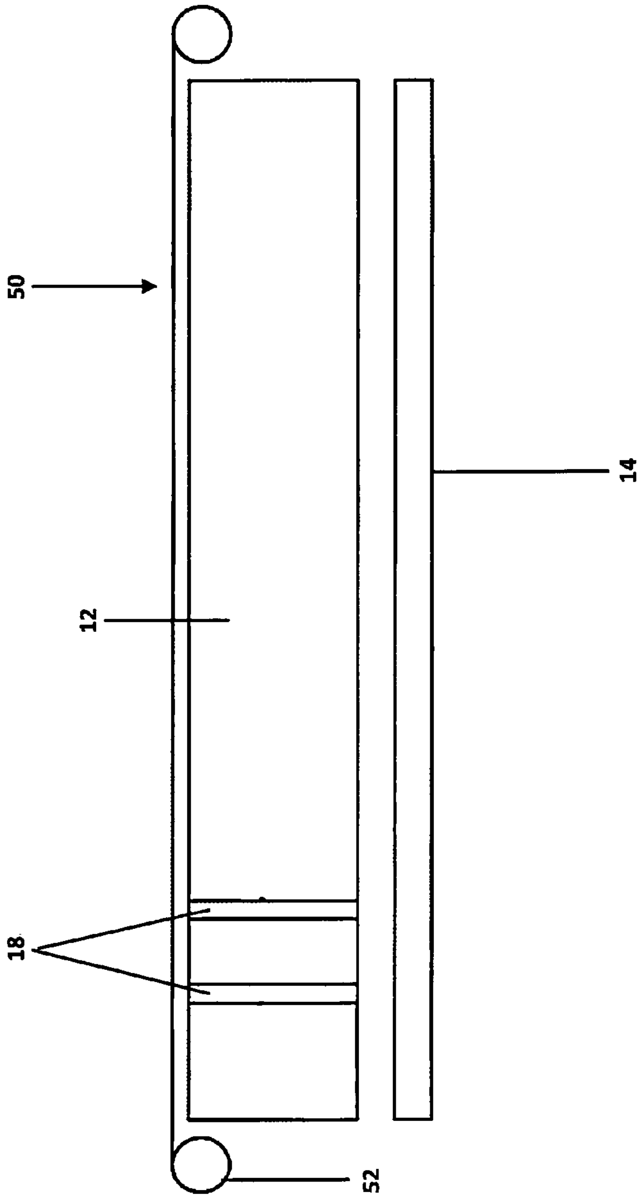
FIG. 11 is an elevation view of the pegboard, image display and protective film assembly.

Referring now to FIG. 11 a side view of the digital wire harness assembly system 10 is shown. A roll of continuous transparent film 50 may be located at one end of the pegboard 12 such that the film 50 may be pulled across and cover the pegboard 12 to protect it from scratching or to allow the operator to draw or label on such. When the film 50 needs to be changed, the old film 50 is pulled away from the continuous roll 52 allowing new film 50 to be dispensed. The film 50 can be easily punched through by special pegs 20 made for such.

Pegs 20 can be of various lengths and diameter to accommodate various types of harnesses 32, wire sizes and number of wire runs 24.

The grid size, shape, and pattern of the pegholes 18 in the pegboard 12 can vary to accommodate various kinds of jobs and or requirements.

The pegboard 12 and assembled harness 32 may be easily removed as a unit from the digital display 14 and transported to another location for further processing or assembly of the harness 32.

The pegs 20 are designed to have different mechanisms for securing them to the pegboard 12. A first method is a peg 20 having a tapered shape that frictionally engages a similarly shaped peghole 18 in the pegboard 12. Another method is a peg 20 with bottom protruding ears designed for a twist lock bottom for mating securely with receiving grooves in the pegholes 18 of the pegboard 12.

The operator can easily move his head to the side or below an installed wire run 24 to see the display information below the harness 32.

A quality control (QC) inspection routine is built into the computer program to allow a QC inspector to step through the assembled harness 32 with visual display information and confirm each wire run 24 has been assembled correctly.

The display 14 has to be calibrated such that it is 1:1 as the harnesses 32 are being built to actual dimensions.

Tie wrap or cable tie 26 locations are indicated on the display 14 to assist the operator in placing them correctly.

A wireless mouse 54 can be used on the interactive pegboard 12/display 14 to control the software and or program. A wireless keyboard 56 can also be placed on the pegboard 12 and used to control the software.

A digitized surface 58 on the pegboard 12/display 14 allows for reverse engineering of old harnesses 32 so that the appropriate build information can be determined from an actual 'used' harness 32.

In an alternate mode, the tool bar 16 and work instruction windows 42, 44 will automatically move back and forth along the length of the display 14 as the operator moves back and forth so that the displayed information 42, 44 is always in front of the operator. The system senses the operator's location from a wireless transmitter 60 he is wearing on his waistband, or by sensing pressure from the operator's manual work on the pegboard 12.

The operator can override this 'track' mode through different inputs such as the wireless mouse or keypad or at the PC keyboard and mouse. The tool bar 16 and work instruction windows 42, 44 can be set into a fixed position on the display 14, or operate in 'sequence mode' where they progress from a first work location to a subsequent work location.

A method for confirming that a peg 20 has been inserted and/or a wire has been placed is provided. Peg 20 insertion may be sensed from pressure in the pegboard 12 pegholes 18, or sensing capacitive changes due to human touch as a peg 20 is inserted, or touch screen technology. Wire placement may be sensed by end to end electrical conductance along a wire run 24, or a capacitive change along the wire run 24. This may entail technologies or a combination of technologies such as pressure sensitive pegs, touch screen technology, and or software. In another alternative mode, the system may restrict the next image from being displayed until confirmation has been received that the previous task has been performed.

The fluorescent pegs 20 will be available in varying configurations, sizes and diameters. In one embodiment they are encased in a metal housing to provide maximum strength while at the same time keeping the diameter to a minimum. The metal housing may be full coverage or leave an open bottom and top for the fluorescent effect.

Voice recognition and audio technology will be used to communicate instructions/information or receive instructions/information. In one embodiment, the PC will support the operator with verbal commands/instructions and information. The PC will also receive and process audio acknowledgement and commands from the operator. For example, the program will not advance to the next step until it receives an acknowledgment from the operator the current manufacturing step is complete. All command normally input by keypad or mouse will be receivable by the PC with voice recognition technology. The operator may command the toolbar 16 to reposition, or request a video note or instruction note to be displayed. The operator may command the PC to advance to the next assembly instruction which will cause a new wire run to be illuminated, new notes and videos to be display. The notes can be converted into audio. The operator may wear a wireless audio headset with a microphone for communicating with the PC.

A variety of wireless technologies may be employed such as Bluetooth, infrared, cellular, radio frequency or any such technology that will allow for instructions/commands/information to be remotely communicated to and from the PC.

In another embodiment the operator may command the system 10 to display a digital ruler 62 the entire length and/or width of the display 14. The ruler 62 will be provided in either English or Metric measure, or in any other standard units of length. Also a visual grid 64 of operator selectable dimensions such as 0.5"×0.5" may be displayed on the digital display 14 to assist the operator in judging distance and lengths.

The digital wire harness pegboard 12 and display 14 are supported by a specially designed stand 64. The stand 64 is operator adjustable in height and angle of tilt for the pegboard 12/display 14. The adjustment of height and tilt may be performed by mechanical, electrical or hydraulic actuators. The stand 64 also has fixed film spools at either end of the pegboard 12, one spool for dispensing film and a second spool for receiving used film. The film advancement may be controlled by mechanical means or by an electric motor. The film advancement may be controlled through a tool icon 40 in the toolbar 16, or via the PC, or by voice command.

Various wire spools 66 are attached to the stand 64 so as to be readily available to dispense all of the wire types needed for a harness 32. A unique color LED is attached to the output of each wire spool 66 so to assist in matching the wire type with the wire run 24. If a blue wire run 24 is displayed as the next assembly step, the operator pulls wire from the spool with the blue LED next to its output. Alternatively the LEDs may flash to indicate which spool should be used in the next step.

The system 10 also has operator selectable levels of transparency/brightness for the displayed tool bar 16 and instruction and video notes 42, 44. These visual images can be controlled so as not to obscure the underlying wire run 24/harness 32 images, as well as reduce unwanted brightness so as to assist in the operator's comfort by minimizing eye fatigue.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A wire harness assembly system for building a wire harness comprising:

a digital display in communication with image rendering controller;

a transparent pegboard having a grid of pegholes for receiving a plurality of pegs;

wherein images rendered on the display are visible to an operator through the transparent pegboard;

a first peg location illumination mark displayed on said digital display;

said first peg location illumination mark illuminating a first peghole;

a second peg location illumination mark displayed on said digital display;

wherein said second peg location illumination mark illuminates a second peghole;

a first wire run location illumination line displayed on said digital display;

wherein said first wire run location illumination line illuminates a first wire run originating on said first peg location illumination mark and terminating on said second peg location illumination mark;

a toolbar displayed on said digital display;

said toolbar having at least one tool icon;

wherein said toolbar and tool icon are clearly visible through said transparent pegboard;

a note displayed in selectable locations on said digital display;

wherein said note is clearly visible through said transparent pegboard;

a video displayed in selectable locations on said digital display;

wherein said video is clearly visible through said transparent pegboard;

a computer program executing on said image controller;

an input device and an output monitor for communication with an operator;

a transparent film roll dispenser located at a first end of said pegboard;

a film roll take up reel located at an opposite pegboard end from said roll dispenser;

wherein a sheet of continuous transparent film originating from said dispenser and terminating in said take up reel, covers the entire surface of said pegboard.

2. A wire harness assembly system as in claim 1 and further comprising:

a first wire spool located at an end of said pegboard;

a lamp attached to said first wire spool;

wherein said lamp emits a visual signal indicating said first wire is selected for installation on said pegboard.

* * * * *